United States Patent

Kuno

(10) Patent No.: US 7,384,888 B2
(45) Date of Patent: Jun. 10, 2008

(54) CERIUM-ZIRCONIUM COMPOSITE METAL OXIDE

(75) Inventor: Oji Kuno, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 489 days.

(21) Appl. No.: 10/661,596

(22) Filed: Sep. 15, 2003

(65) Prior Publication Data

US 2005/0059547 A1    Mar. 17, 2005

(51) Int. Cl.
  *B01J 23/00* (2006.01)
  *B01J 23/40* (2006.01)
  *B01J 23/41* (2006.01)
  *B01J 23/42* (2006.01)
  *B01J 23/44* (2006.01)

(52) U.S. Cl. ............... 502/326; 502/302; 502/303; 502/304; 502/339; 502/349; 502/527.12

(58) Field of Classification Search ................ 502/302, 502/303, 304, 326, 339, 349, 527.12
See application file for complete search history.

(56) References Cited

U.S. PATENT DOCUMENTS

| | | | | |
|---|---|---|---|---|
| 4,115,144 | A * | 9/1978 | Chambers et al. | 106/442 |
| 5,071,676 | A * | 12/1991 | Jacobson | 427/216 |
| 5,693,299 | A | 12/1997 | Chopin et al. | |
| 5,837,642 | A * | 11/1998 | Tanaka et al. | 502/304 |
| 5,891,237 | A * | 4/1999 | Kinniard | 106/505 |
| 5,935,871 | A * | 8/1999 | Farkas et al. | 438/693 |
| 5,945,369 | A * | 8/1999 | Kimura et al. | 502/304 |
| 5,976,237 | A * | 11/1999 | Halko et al. | 106/443 |
| 6,139,814 | A * | 10/2000 | Shigapov et al. | 423/592.1 |
| 6,171,572 | B1 * | 1/2001 | Aozasa | 423/594.12 |
| 6,228,799 | B1 * | 5/2001 | Aubert et al. | 502/304 |
| 6,261,989 | B1 * | 7/2001 | Tanaka et al. | 502/217 |
| 6,326,329 | B1 * | 12/2001 | Nunan | 502/242 |
| 6,339,037 | B1 * | 1/2002 | Kase et al. | 502/300 |
| 6,528,451 | B2 * | 3/2003 | Brezny et al. | 502/304 |
| 6,585,944 | B1 * | 7/2003 | Nunan et al. | 423/239.1 |
| 6,682,706 | B1 * | 1/2004 | Yamamoto et al. | 422/180 |

(Continued)

FOREIGN PATENT DOCUMENTS

EP    0 614 854 A1    9/1994

(Continued)

*Primary Examiner*—Cam N. Nguyen
(74) *Attorney, Agent, or Firm*—Oliff & Berridge, PLC

(57) ABSTRACT

A cerium-zirconium composite metal oxide having improved durability at high temperature and a stable oxygen storage capacity is provided. The cerium-zirconium composite metal oxide is characterized in that the total mole number of Ce and Zr is at least 85% based on the total mole number of metal in the composite metal oxide, a molar ratio Ce/Zr is within a range from 1/9 to 9/1, and an isoelectric point of the composite metal oxide is more than 3.5. Preferably, the molar ratio Ce/Zr is within a range from 3/7 to 7/3 and the isoelectric point is within a range from 3.8 to 5.0, and the cerium-zirconium composite metal oxide contains a rare earth metal (excluding Ce) in a concentration of less than 15% by mole based on the total mole number of metal in the composite metal oxide. Also the present invention provides a cerium-zirconium composite metal oxide, characterized in that $CeO_2$ forms a core surrounded by $ZrO_2$.

15 Claims, 1 Drawing Sheet

U.S. PATENT DOCUMENTS

| | | | |
|---|---|---|---|
| 6,831,036 B1 * | 12/2004 | Yamazaki et al. | 502/327 |
| 6,956,008 B2 * | 10/2005 | Takeshima et al. | 502/326 |
| 7,052,777 B2 * | 5/2006 | Brotzman et al. | 428/570 |
| 2005/0227864 A1 * | 10/2005 | Sutorik et al. | 502/304 |

FOREIGN PATENT DOCUMENTS

| | | |
|---|---|---|
| EP | 0 955 267 A1 | 11/1999 |
| FR | 2 756 819 | 6/1998 |
| JP | 02048418 | 2/1990 |
| JP | A 6-279027 | 10/1994 |
| JP | A 10-194742 | 7/1998 |
| JP | 2001-348223 | 12/2001 |

\* cited by examiner $ZrO_2$+STABILIZING AGENT
$CeO_2$

RELATIONSHIP BETWEEN pH AND ZETA POTENTIAL

CERIUM-ZIRCONIUM COMPOSITE METAL OXIDE

BACKGROUND OF THE INVENTION

1. Field of the Invention

The present invention relates to a cerium-zirconium composite metal oxide and, more particularly, to a cerium-zirconium composite metal oxide which is suitable for use as a promoter for an exhaust gas purifying catalyst for an internal combustion engine.

2. Description of the Related Art

Exhaust gas emitted from an internal combustion engine such as an automobile engine includes such substances as nitrogen oxides (NOx), carbon monoxide (CO) and hydrocarbons (HC). These harmful substances can be neutralized by means of a three-way catalyst which oxidizes CO and HC and reduces NOx into $O_2$.

Such a three-way catalyst is generally composed of a support made of an oxide such as γ-alumina, and a catalyst component consisting of a noble metal such as platinum (Pt), palladium (Pd) or rhodium (Rh) supported on the support.

In order for the oxidation of CO and HC and reduction of NOx to proceed efficiently on the three-way catalyst, it is necessary that the air-fuel ratio in the internal combustion engine is properly controlled and that the composition of the exhaust gas lies within a narrow, particular range. In reality, however, the composition of the exhaust gas experiences some variations due to such factor as a delay in the operation of a control system, and may deviate out of the above-mentioned narrow range.

In a cerium-zirconium composite metal oxide, Ce atoms can change the valence thereof between 3 and 4. In an oxidizing atmosphere including a relatively large amount of $O_2$ the Ce atom changes the valence from 3 to 4 and absorbs oxygen, while in a reducing atmosphere containing a relatively large amount of CO and HC the Ce atom changes the valence from 4 to 3 and releases oxygen, thus demonstrating an oxygen storage capacity (OSC).

Therefore, including the cerium-zirconium composite metal oxide in an exhaust gas purifying catalyst has an effect of mitigating the variations in the exhaust gas composition in the vicinity of catalyst component, thereby causing the purification of exhaust gas to proceed more efficiently.

In addition, absorption of oxygen by the cerium-zirconium composite metal oxide is accompanied by the generation of a significant amount of heat, and the heat can be used to warm up the catalyst when starting up the engine, thus making it possible to shorten the time before the catalyst is activated. For this reason, the cerium-zirconium composite metal oxide is used as a promoter for an exhaust gas purifying catalyst.

Prior art related to the cerium-zirconium composite metal oxide includes those disclosed in Japanese Unexamined Patent Publication (Kokai) No. 10-194742 and in Japanese Unexamined Patent Publication (Kokai) No. 6-279027.

However, the cerium-zirconium composite metal oxide has a drawback that the oxygen storage capacity decreases after it has been exposed to a high temperature of about 1000° C. or more for a long period of time, thus showing an insufficient durability.

SUMMARY OF THE INVENTION

Accordingly, an object of the present invention is to provide a cerium-zirconium composite metal oxide having improved durability at high temperature and showing a stable oxygen storage capacity.

The object described above can be achieved by a cerium-zirconium composite metal oxide characterized in that the total mole number of Ce and Zr is at least 85% based on the total mole number of metal in the composite metal oxide, a molar ratio Ce/Zr is within a range from 1/9 to 9/1, and an isoelectric point of the composite metal oxide is more than 3.5.

In other word, the present invention provides a cerium-zirconium composite metal oxide which has a specific composition and, especially, has an isoelectric point more than 3.5.

The term "isoelectric point" is a characteristic value measured on the basis of electrophoresis of particles contained in a slurry, and the isoelectric point of $CeO_2$ is 2.4 and the isoelectric point of $ZrO_2$ is 4.0 according to a method specified in the present invention. Accordingly, the cerium-zirconium composite metal oxide of the present invention is characterized in that it has a value of isoelectric point near to that of $ZrO_2$ while containing both $CeO_2$ and $ZrO_2$.

The cerium-zirconium composite metal oxide of the present invention has a value of the isoelectric point significantly higher than that of the cerium-zirconium composite metal oxide of the prior art which has similar proportions of $CeO_2$ and $ZrO_2$. An exhaust gas purifying catalyst which has Pt supported on such a cerium-zirconium composite metal oxide has durability significantly improved over that of the prior art.

Based on these facts, it is considered that the cerium-zirconium composite metal oxide of the present invention has such a constitution as the constituent particles thereof are made mainly of $ZrO_2$ in the outer layer and mainly of $CeO_2$ inside, as shown in FIG. 1, and this constitution is stabilized when a trace of element selected from among rare earth metals coexists with $ZrO_2$.

In another aspect, the present invention provides a cerium-zirconium composite metal oxide, characterized in that the total mole number of Ce and Zr is at least 85% based on the total mole number of metal in the composite metal oxide and $CeO_2$ forms a core surrounded by $ZrO_2$.

When the particles of cerium-zirconium composite metal oxide are made of $CeO_2$ and $ZrO_2$ in such a constitution as described above, it is considered that $ZrO_2$ having high heat resistance maintains the form of particles of cerium-zirconium composite metal oxide so that $CeO_2$ existing inside and/or $CeO_2$—$ZrO_2$ in the border region between the inside and the outer layer are made stable with time, thereby demonstrating the satisfactory oxygen storage capacity.

It is to be understood that FIG. 1 shows a mere model and is not intended to limit the present invention.

DESCRIPTION OF THE PREFERRED EMBODIMENT

Figure 1:
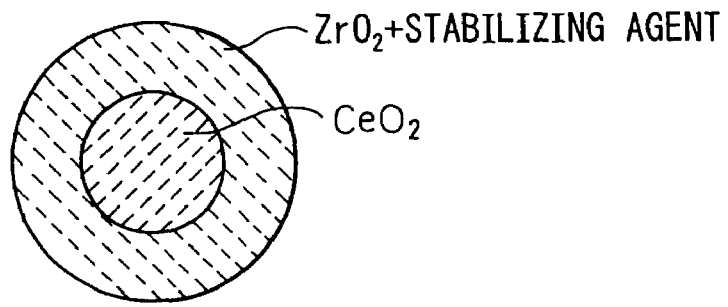
FIG. 1 shows a model of a cerium-zirconium composite metal oxide of the present invention.

The present invention provides a cerium-zirconium composite metal oxide, characterized in that the total mole number of Ce and Zr is at least 85% based on the total mole number of metal in the composite metal oxide, a molar ratio Ce/Zr is within a range from 1/9 to 9/1, and an isoelectric point of the composite metal oxide is more than 3.5 and, more preferably, the molar ratio Ce/Zr is within a range from 3/7 to 7/3 and the isoelectric point is within a range from 3.8 to 5.0.

In the present invention, the isoelectric point is defined as a value measured by the stop watch method, a version of the electrophoretic microscope method specified in JIS R1638.

The cerium-zirconium composite metal oxide refers to an oxide which contains at least Ce and Zr and may also contain another additional metallic element. The additional metallic element may be selected from among a wide range comprising s-block metals, d-block metals, p-block metals and f-block metals, such as sodium (Na), potassium (K), magnesium (Mg), calcium (Ca), barium (Ba), strontium (Sr), lanthanum (La), yttrium (Y), cerium (Ce), praseodymium (Pr), neodymium (Nd), samarium (Sm), europium (Eu), gadolinium (Gd), titanium (Ti), tin (Sn), zirconium (Zr), manganese (Mn), iron (Fe), cobalt (Co), nickel (Ni), chromium (Cr), niobium (Nb), copper (Cu), vanadium (V), molybdenum (Mo), tungsten (W), zinc (Zn), aluminum (Al), silicon (Si) and tantalum (Ta).

The additional metallic element mentioned above is preferably at least one of rare earth metals such as La, Y, Ce, Pr, Nd, Sm, Eu and Gd, and is contained in a concentration less than 15% based on the total mole number of metal in the cerium-zirconium composite metal oxide.

When such a rare earth metal is used as the additional metallic element, it is considered that $ZrO_2$ which surrounds the core is especially stabilized.

The cerium-zirconium composite metal oxide of such a constitution is preferably produced by using a ceria sol as a source of cerium and is obtained by mixing the ceria sol and a zirconium compound solution or a zirconia sol, and preferably a solution of a compound of the additional metallic element or a sol thereof in a predetermined proportion to prepare a suspension, and then drying and firing the suspension.

The term "sol" in ceria sol and zirconia sol refers to colloid of an oxide or hydrate which is dispersed in a liquid, particularly in water, which can produce a metal oxide such as ceria or zirconia when fired. Specifically, the sol may be a material which is obtained by hydrolyzing alkoxide, acetylacetonato, acetate, nitrate or the like of such element as cerium or zirconium in a solution.

The zirconium compound solution may be, for example, an aqueous solution of zirconium oxynitrate $ZrO(NO_3)_2 \cdot 2H_2O$, zirconium oxide $ZrCl_4$ or the like.

The material is fired, for example, in an air atmosphere at a temperature from 600 to 900° C. for several hours. The cerium-zirconium composite metal oxide thus prepared is processed in a grinding process as required, and is provided with a noble metal such as platinum, palladium or rhodium supported thereon, thereby making the exhaust gas purifying catalyst.

The exhaust gas purifying catalyst can demonstrate high and stable exhaust gas purifying performance without degradation of the oxygen storage capacity even when exposed to a high temperature of about 1000° C.

The following Examples further illustrate the present invention.

EXAMPLES

Example 1

A solution prepared by dissolving 41.16 g of zirconium oxynitrate and 6.48 g of yttrium nitrate in 100 g of ion-exchanged water was added to 193.33 g of a ceria sol (containing 15% by weight of Needral U-15, manufactured by TAKI CHEMICAL CO., LTD. as $CeO_2$) and stirred to prepare a uniform suspension.

The suspension was heated at 120° C. for 24 hours to evaporate water, and then fired at 700° C. for 5 hours to obtain a cerium-zirconium composite metal oxide of the present invention having the following composition (weight ratio).

$CeO_2/ZrO_2/Y_2O_3=58/38/4$

Then, 50 g of this composite metal oxide was dispersed in 300 g of ion-exchanged water to prepare a slurry. Then, 11.36 g of an aqueous solution of a diamminedinitroplatinum complex (Pt concentration: 4.4% by weight) was added to the slurry, followed by stirring for 2 hours.

The slurry was then heated at 120° C. for 24 hours to evaporate water, and fired at 500° C. for 2 hour to obtain an exhaust gas purifying catalyst comprising a cerium-zirconium composite metal oxide of the present invention and 1% by weight of Pt supported on the cerium-zirconium composite metal oxide.

Example 2

A solution prepared by dissolving 6.48 g of yttrium nitrate in 50 g of ion-exchanged water and 95 g of a zirconia sol (containing 20% by weight of Zirconia HA, manufactured by Daiichi Kigensokagaku Kogyo Co., Ltd. as $ZrO_2$) were added to 193.33 g of the ceria sol described above and stirred to prepare a uniform suspension.

The suspension was heated to evaporate water in the same manner as in Example 1, and then fired at 700° C. for 5 hours to obtain a cerium-zirconium composite metal oxide having the following composition (weight ratio) of the present invention.

$CeO_2/ZrO_2/Y_2O_3=58/38/4$

Then, in the same manner as in Example 1, 1% by weight of Pt was supported on the composite metal oxide using the diamminedinitroplatinum complex to obtain an exhaust gas purifying catalyst of the present invention.

Example 3

A solution prepared by dissolving 6.48 g of yttrium nitrate in 50 g of ion-exchanged water and 154.5 g of a zirconia sol (including 12.5% by weight of Zirconia AC7 manufactured by DAIICHI KIGENSO KAGAKU KOGYO CO., LTD. All as $ZrO_2$) were added to 193.33 g of the ceria sol described above and stirred to prepare a uniform suspension.

The suspension was heated to evaporate water in the same manner as in Example 1, and then fired at 700° C. for 5 hours to obtain a cerium-zirconium composite metal oxide having the following composition (weight ratio) of the present invention.

$CeO_2/ZrO_2/Y_2O_3=58/38/4$

Then, in the same manner as in Example 1, 1% by weight of Pt was supported on the composite metal oxide using the diamminedinitroplatinum complex to obtain an exhaust gas purifying catalyst of the present invention.

Example 4

A solution prepared by dissolving 34.66 g of zirconium oxynitrate, 3.99 g of lanthanum nitrate and 8.94 g of praseodymium nitrate in 300 g of ion-exchanged water was added to 193.33 g of the ceria sol described above and then stirred to prepare a uniform suspension.

The suspension was heated to evaporate water in the same manner as in Example 1, and then fired at 700° C. for 5 hours to obtain a cerium-zirconium composite metal oxide having the following composition (weight ratio) of the present invention.

$CeO_2/ZrO_2/La_2O_3/Pr_6O_{11}=58/32/3/7$

Then, in the same manner as in Example 1, 1% by weight of Pt was supported on the composite metal oxide using the diamminedinitroplatinum complex to obtain an exhaust gas purifying catalyst of the present invention.

Comparative Example 1

A solution was prepared by dissolving 73.165 g of cerium nitrate, 41.16 g of zirconium oxynitrate and 6.48 g of yttrium nitrate in 500 g of ion-exchanged water. Ammonia water having a concentration of 1 mole/liter was added dropwise to the solution to adjust the pH value to about 9, thereby to obtain a precipitate by coprecipitation.

The solution containing the precipitate was heated to evaporate water in the same manner as in Example 1, and then fired at 700° C. for 5 hours to obtain a cerium-zirconium composite metal oxide having the following composition (weight ratio) of the Comparative Example.

$CeO_2/ZrO_2/Y_2O_3=58/38/4$

Then, in the same manner as in Example 1, 1% by weight of Pt was supported on the composite metal oxide using the diamminedinitroplatinum complex to obtain an exhaust gas purifying catalyst of the Comparative Example.

Comparative Example 2

A solution was prepared by dissolving 73.17 g of cerium nitrate, 34.66 g of zirconium oxynitrate, 3.99 g of lanthanum nitrate and 8.94 g of praseodymium nitrate in 500 g of ion-exchanged water.

A precipitate was produced from the solution by coprecipitation to evaporate water in the same manner as in Example 1, and then fired at 700° C. for 5 hours to obtain a cerium-zirconium composite metal oxide having the following composition (weight ratio) of the Comparative Example.

$CeO_2/ZrO_2/La_2O_3/Pr_6O_{11}=58/32/3/7$

Then, in the same manner as in Example 1, 1% by weight of Pt was supported on the composite metal oxide using the diamminedinitroplatinum complex to obtain an exhaust gas purifying catalyst of the Comparative Example.

Comparative Example 3

29 g of cerium oxide powder was dispersed in 500 g of ion-exchanged water, and then a solution prepared by dissolving 41.16 g of zirconium oxynitrate and 6.48 g of yttrium nitrate in 200 g of ion-exchanged water was added dropwise and stirred to prepare a slurry.

Ammonia water was added dropwise to the slurry to adjust the pH value to about 9 in the same manner as in Comparative Example 1 to produce a precipitate containing zirconium and yttrium.

The slurry was heated to evaporate water, and then fired at 700° C. for 5 hours to obtain a cerium-zirconium composite metal oxide having the following composition (weight ratio) of the Comparative Example.

$CeO_2/ZrO_2/Y_2O_3=58/38/4$

Then, in the same manner as in Comparative Example 1, 1% by weight of Pt was supported on the composite metal oxide using the diamminedinitroplatinum complex to obtain an exhaust gas purifying catalyst of the Comparative Example.

Measurement of Isoelectric Point

Values of isoelectric point of the samples of cerium-zirconium composite metal oxide produced in Examples 1 to 4 and Comparative Examples 1 to 3 were measured by the stop watch method, a version of the electrophoretic microscope method specified in JIS R1638. The results are summarized in Table 1.

Figure 2:
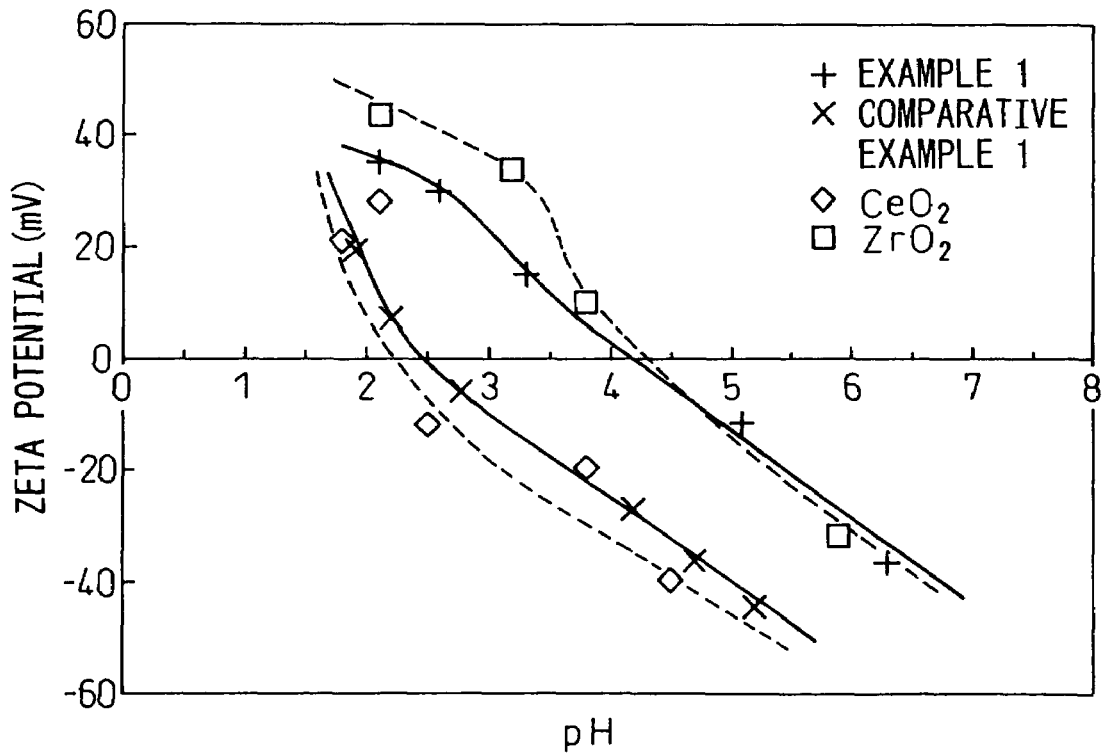
FIG. 2 is a graph showing a relationship between the pH and the zeta potential in the measurement of an isoelectric point.

A relationship between the pH and the zeta potential measured so as to determine the isoelectric point by the measuring method described above for the cerium-zirconium composite metal oxide of Example 1 and Comparative Example 1, $CeO_2$ powder and $ZrO_2$ powder are shown in FIG. 2.

These results show a clear difference in the isoelectric point of the cerium-zirconium composite metal oxide between the Examples and the Comparative Examples. The Examples showed isoelectric points near that of $ZrO_2$ powder, while the Comparative Examples showed isoelectric points near that of $CeO_2$ powder.

As the compositions of the cerium-zirconium composite metal oxide were the same between Examples 1 to 3 and Comparative Examples 1 and 3, and Example 4 and Comparative Example 2, the difference described above is considered to be attributed to the form of $CeO_2$ and $ZrO_2$. It is believed that the Examples showed the isoelectric point near that of $ZrO_2$ powder since the cores made of $CeO_2$ are surrounded by $ZrO_2$ in the Examples as shown in FIG. 1.

Evaluation of Catalyst Performances

The samples of cerium-zirconium composite metal oxide made in Examples 1 to 4 and Comparative Examples 1 to 3 were compressed and crushed to make pellets about 2 mm in diameter. About 2.0 g of each of the samples was taken and tested to evaluate catalyst performances.

The exhaust gas purifying catalysts were fired at 1000° C. for 3 hours for the purpose of comparing the durability, before the evaluation of catalyst performances.

Evaluation test was conducted by measuring the rate of neutralizing the components $C_3O_6$ (HC), NO and CO while raising the catalyst bed temperature at a rate of 10° C./minute up to 400° C., and changing between carbon rich gas and lean gas having compositions shown in Table 1 at intervals of one minute, so that any difference in the oxygen storage capacity can be observed distinctly. The catalytic performances were evaluated in terms of the temperature at which 50% of the component was neutralized. The test results are summarized in Table 2.

TABLE 1

Gas composition for evaluation

| | $N_2$ (%) | $CO_2$ (%) | NO (ppm) | CO (%) | $C_3H_6$ (ppmC) | $H_2$ (%) | $O_2$ (%) | $H_2O$ (%) |
|---|---|---|---|---|---|---|---|---|
| Rich gas | Balance | 10 | 2200 | 2.80 | 2500 | 0.27 | 0.77 | 10 |
| Lean gas | Balance | 10 | 2200 | 0.81 | 2500 | 0 | 1.7 | 10 |

TABLE 2

Results of the measurement of catalyst performances and isoelectric point

| | Composition | Weight ratio | HC | NO | CO | Isoelectric point |
|---|---|---|---|---|---|---|
| Example 1 | Ce—Zr—Y—O | 58/38/4 | 234 | 266 | 180 | 4.2 |
| Example 2 | Ce—Zr—Y—O | 58/38/4 | 253 | 286 | 221 | 3.9 |
| Example 3 | Ce—Zr—Y—O | 58/38/4 | 263 | 301 | 216 | 4.1 |
| Example 4 | Ce—Zr—La—Pr—O | 58/32/3/7 | 245 | 270 | 201 | 4.0 |
| Comparative Example 1 | Ce—Zr—Y—O | 58/38/4 | 280 | 308 | 242 | 2.5 |
| Comparative Example 2 | Ce—Zr—La—Pr—O | 58/32/3/7 | 269 | 303 | 253 | 2.2 |
| Comparative Example 3 | Ce—Zr—Y—O | 58/38/4 | 302 | 366 | 299 | 3.3 |

What is claimed is:

1. A cerium-zirconium composite metal oxide, wherein a total mole number of Ce and Zr is at least 85% based on the total mole number of metal in the composite metal oxide, wherein a molar ratio Ce/Zr is within a range from 1/9 to 9/1, and wherein an isoelectric point of the composite metal oxide is more than 3.5.

2. The cerium-zirconium composite metal oxide according to claim 1, wherein the molar ratio Ce/Zr is within a range from 3/7 to 7/3 and the isoelectric point is within a range from 3.8 to 5.0.

3. The cerium-zirconium composite metal oxide according to claim 2, which contains rare earth metal (excluding Ce) in a concentration of less than 15% by mole based on the total mole number of metal in the composite metal oxide.

4. An exhaust gas purifying catalyst comprising the cerium-zirconium composite metal oxide of claim 2 and a noble metal supported on the cerium-zirconium composite metal oxide.

5. A method for synthesizing the cerium-zirconium composite metal oxide of claim 2, which comprises mixing a ceria sol and a zirconium compound solution or a zirconia sol to prepare a suspension, and drying and firing the mixture.

6. The cerium-zirconium composite metal oxide according to claim 1, which contains rare earth metal (excluding Ce) in a concentration of less than 15% by mole based on the total mole number of metal in the composite metal oxide.

7. An exhaust gas purifying catalyst comprising the cerium-zirconium composite metal oxide of claim 6 and a noble metal supported on the cerium-zirconium composite metal oxide.

8. A method for synthesizing the cerium-zirconium composite metal oxide of claim 6, which comprises mixing a ceria sol and a zirconium compound solution or a zirconia sol to prepare a suspension, and drying and firing the mixture.

9. An exhaust gas purifying catalyst comprising the cerium-zirconium composite metal oxide of claim 1 and a noble metal supported on the cerium-zirconium composite metal oxide.

10. A method for synthesizing the cerium-zirconium composite metal oxide of claim 1, which comprises mixing a ceria sol and a zirconium compound solution or a zirconia sol to prepare a suspension, and drying and firing the mixture.

11. A cerium-zirconium composite metal oxide, wherein a total mole number of Ce and Zr is at least 85% based on the total mole number of metal in the composite metal oxide and wherein $CeO_2$ forms a core surrounded by $ZrO_2$, and wherein an isoelectric point of the composite metal oxide is more than 3.5.

12. The cerium-zirconium composite metal oxide according to claim 11, wherein the $CeO_2$ core has a diameter within a range from 5 to 20 nm.

13. An exhaust gas purifying catalyst comprising the cerium-zirconium composite metal oxide of claim 12 and a noble metal supported on the cerium-zirconium composite metal oxide.

14. An exhaust gas purifying catalyst comprising the cerium-zirconium composite metal oxide of claim 11 and a noble metal supported on the cerium-zirconium composite metal oxide.

15. A method for synthesizing the cerium-zirconium composite metal oxide of claim 11, which comprises mixing a ceria sol and a zirconium compound solution or a zirconia sol to prepare a suspension, and drying and firing the mixture.

* * * * *